United States Patent
Furuskär et al.

(10) Patent No.: US 11,778,498 B2
(45) Date of Patent: Oct. 3, 2023

(54) METHOD AND SYSTEM FOR DETERMINING SIGNAL QUALITY INDICATIONS

(71) Applicant: Telefonaktiebolaget LM Ericsson (publ), Stockholm (SE)

(72) Inventors: Anders Furuskär, Stockholm (SE); Niklas Jaldén, Enköping (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 101 days.

(21) Appl. No.: 17/437,108

(22) PCT Filed: Mar. 26, 2019

(86) PCT No.: PCT/SE2019/050269
§ 371 (c)(1),
(2) Date: Sep. 8, 2021

(87) PCT Pub. No.: WO2020/197452
PCT Pub. Date: Oct. 1, 2020

(65) Prior Publication Data
US 2022/0182157 A1 Jun. 9, 2022

(51) Int. Cl.
*H04B 17/24* (2015.01)
*H04B 17/26* (2015.01)
(Continued)

(52) U.S. Cl.
CPC ............ *H04W 24/10* (2013.01); *H04B 17/24* (2015.01); *H04B 17/26* (2015.01); *H04B 17/309* (2015.01);
(Continued)

(58) Field of Classification Search
CPC ...... H04B 17/0082–409; H04J 11/0023–0066; H04L 1/0001–248;
(Continued)

(56) References Cited

U.S. PATENT DOCUMENTS 6,137,824 A 10/2000 Liu
9,209,870 B1 12/2015 Nammi et al.
(Continued)

OTHER PUBLICATIONS

International Search Report and Written Opinion dated Sep. 1, 2020 for International Application No. PCT/SE2019/050269 filed Mar. 26, 2019, consisting of 11-pages.
(Continued)

*Primary Examiner* — Timothy J Weidner
(74) *Attorney, Agent, or Firm* — Christopher & Weisberg, P.A.

(57) ABSTRACT

Disclosed is a method and performed by a system of a wireless communication network for determining signal quality indications. The method includes determining a correlation between a quality of a signal received at a first wireless device and a quality of a signal received at a second wireless device, obtaining a first indication of quality of a signal received at the first wireless device, and determining a second indication of quality of signals received at the second wireless device based on the first indication and the determined correlation. The system may be implemented in a radio access network node.

17 Claims, 4 Drawing Sheets

(51) Int. Cl.
*H04B 17/309* (2015.01)
*H04L 1/00* (2006.01)
*H04L 1/20* (2006.01)
*H04W 24/08* (2009.01)
*H04W 24/10* (2009.01)
*H04W 28/02* (2009.01)
*H04W 28/04* (2009.01)
*H04W 72/12* (2023.01)
*H04W 84/02* (2009.01)
*H04W 88/02* (2009.01)
*H04W 88/08* (2009.01)
*H04W 92/02* (2009.01)
*H04W 92/10* (2009.01)
*H04W 72/542* (2023.01)
*H04W 72/121* (2023.01)

(52) U.S. Cl.
CPC .......... *H04L 1/0003* (2013.01); *H04L 1/0009* (2013.01); *H04L 1/0026* (2013.01); *H04L 1/0034* (2013.01); *H04L 1/0035* (2013.01); *H04L 1/20* (2013.01); *H04W 24/08* (2013.01); *H04W 28/0231* (2013.01); *H04W 28/04* (2013.01); *H04W 72/121* (2013.01); *H04W 72/542* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 24/02–10; H04W 28/02–26; H04W 36/0005–385; H04W 52/02–60; H04W 72/02–569; H04W 84/005–22; H04W 88/005–188; H04W 92/02–24
See application file for complete search history.

(56) References Cited

U.S. PATENT DOCUMENTS

| | | |
|---|---|---|
| 2005/0031019 A1 | 2/2005 | Itoh |
| 2009/0040936 A1 | 2/2009 | Wu et al. |
| 2009/0068956 A1 | 3/2009 | Naito et al. |
| 2009/0197626 A1* | 8/2009 | Huttunen .............. H04W 72/02 |
| 2009/0296595 A1* | 12/2009 | Khoshnevis .......... H04W 72/21 |
| 2013/0165105 A1 | 6/2013 | Whinnett |
| 2014/0051439 A1 | 2/2014 | Brownworth |
| 2014/0376464 A1 | 12/2014 | Nam et al. |
| 2016/0043795 A1 | 2/2016 | Kroeger et al. |
| 2018/0323883 A1* | 11/2018 | Fodor ................... H04W 8/005 |

OTHER PUBLICATIONS

EPO Communication with Supplementary European Search Report dated Oct. 28, 2022 for Patent Application No. 19921557.5, consisting of 8-pages.

* cited by examiner

METHOD AND SYSTEM FOR DETERMINING SIGNAL QUALITY INDICATIONS

CROSS-REFERENCE TO RELATED APPLICATION

This application is a Submission Under 35 U.S.C. § 371 for U.S. National Stage Patent Application of International Application Number: PCT/SE2019/050269, filed Mar. 26, 2019 entitled "METHOD AND SYSTEM FOR DETERMINING SIGNAL QUALITY INDICATIONS," the entirety of which is incorporated herein by reference.

TECHNICAL FIELD

The present disclosure relates generally to methods and systems for determining signal quality indications for signals received at wireless devices. The present disclosure further relates to computer programs and carriers corresponding to the above methods and nodes.

BACKGROUND

In any wireless communication system, wireless transmissions from a transmitting node to a receiving node, like downlink transmissions from a radio access network node to a wireless device may be improved using knowledge of a communication channel between the transmitting node and the receiving node. One example may be in future wireless communication systems where transmission energy will be directed to specific wireless devices instead of being broadcasted, so called beamforming. For reliable beamforming, the transmitting node, e.g. radio access network node, needs detailed information of the spatial characteristics of the communication channel.

As the wireless communication channel is dynamic, and hence changes over time, it is important that the transmitting node adapts the modulation and coding rate used for the current conditions, in order to maximize the data rate that can be transmitted reliable. In short, for a weak channel we may need robust coding (low coding rate), i.e. low number of information bits relative to encoded bits, and robust (aka low) modulation, like Binary Phase Shift Keying (BPSK) or Quadrature Phase Shift Keying (QPSK), to reliably transfer the information. In another link that has good channel condition, such as for wireless devices close to the radio access network node, or when there are low interference, the coding rate required may be much less robust (higher coding rate), and more bits can be transmitted per instance by using a higher modulation scheme like 256 Quadrature Amplitude Modulation (QAM). To make a good choice of modulation and coding, the transmitting node needs information of the conditions of the channel. This may include for example average signal strength and interference due to signals coming from other transmitters.

Many radio functions in the wireless communication network, such as link adaptation, power control and scheduling, benefit from knowledge of wireless channel conditions, aka signal quality such as signal strength and interference. Obtaining such signal quality measurement take time and consumes radio resources. Consequently, there is a need of improved methods for obtaining and determining signal quality in a wireless communication system.

SUMMARY

It is an object of the invention to address at least some of the problems and issues outlined above. It is possible to achieve these objects and others by using methods, network nodes and wireless communication devices as defined in the attached independent claims.

According to one aspect, a method performed by a system of a wireless communication network for determining signal quality indications is provided. The method comprises determining a correlation between a quality of a signal received at a first wireless device and a quality of a signal received at a second wireless device, obtaining a first indication of quality of a signal received at the first wireless device, and determining a second indication of quality of signals received at the second wireless device based on the first indication and the determined correlation.

According to another aspect, a system operable in a wireless communication system for determining signal quality indications is provided. The system comprises a processing circuitry and a memory. The memory contains instructions executable by said processing circuitry, whereby the system is operative for determining a correlation between a quality of a signal received at a first wireless device and a quality of a signal received at a second wireless device 150, for obtaining a first indication of quality of a signal received at the first wireless device, and for determining a second indication of quality of signals received at the second wireless device 150 based on the first indication and the determined correlation.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The present invention is built on the understanding of the inventors that reception signal quality may be correlated between different wireless devices, for example wireless devices having the same dominant interferer. When such a signal quality correlation is determined between two wireless devices, signal quality indications for one of the two wireless devices may be used to estimate signal quality for the other of the two wireless devices.

Figure 1:
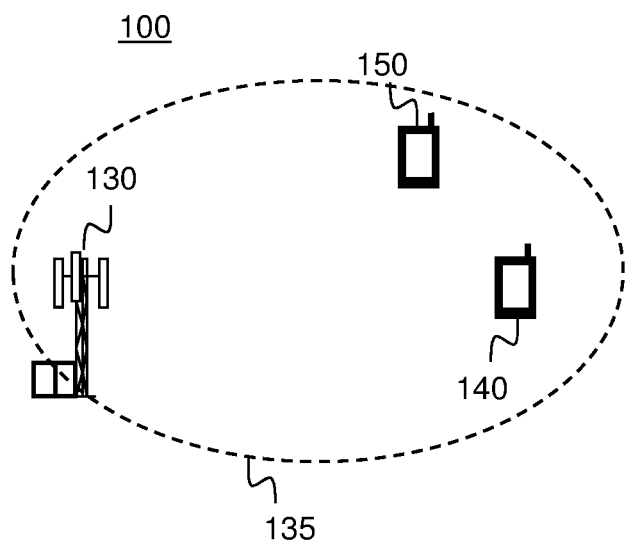
FIG. 1 is a schematic block diagram of a communication scenario in which the present invention may be used.

FIG. 1 shows a wireless communication network 100 in which the present invention may be used. The wireless communication network 100 comprises a radio access network node 130 that is in wireless communication with, or is adapted for wireless communication with wireless devices residing within a cell 135, such as a first wireless device 140 and a second wireless device 150.

The wireless communication network 100 may be any kind of wireless communication network that can provide radio access to wireless devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The radio access network node 130 may be any kind of network node that provides wireless access to the first and second wireless devices 140, 150 alone or in combination with another network node. Examples of such a radio access network node 130 is a base station (BS), a radio BS, a base transceiver station, a BS controller, a network controller, a Node B (NB), an evolved Node B (eNB), a NR BS, a Multi-cell/multicast Coordination Entity, a relay node, an access point (AP), a radio AP, a remote radio unit (RRU), a remote radio head (RRH) and a multi-standard BS (MSR BS).

The first and second wireless devices, aka wireless communication devices 140, 150 may be any type of devices capable of wirelessly communicating with the radio access network node 130 using radio signals. For example, the first and second wireless communication device 140, 150 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
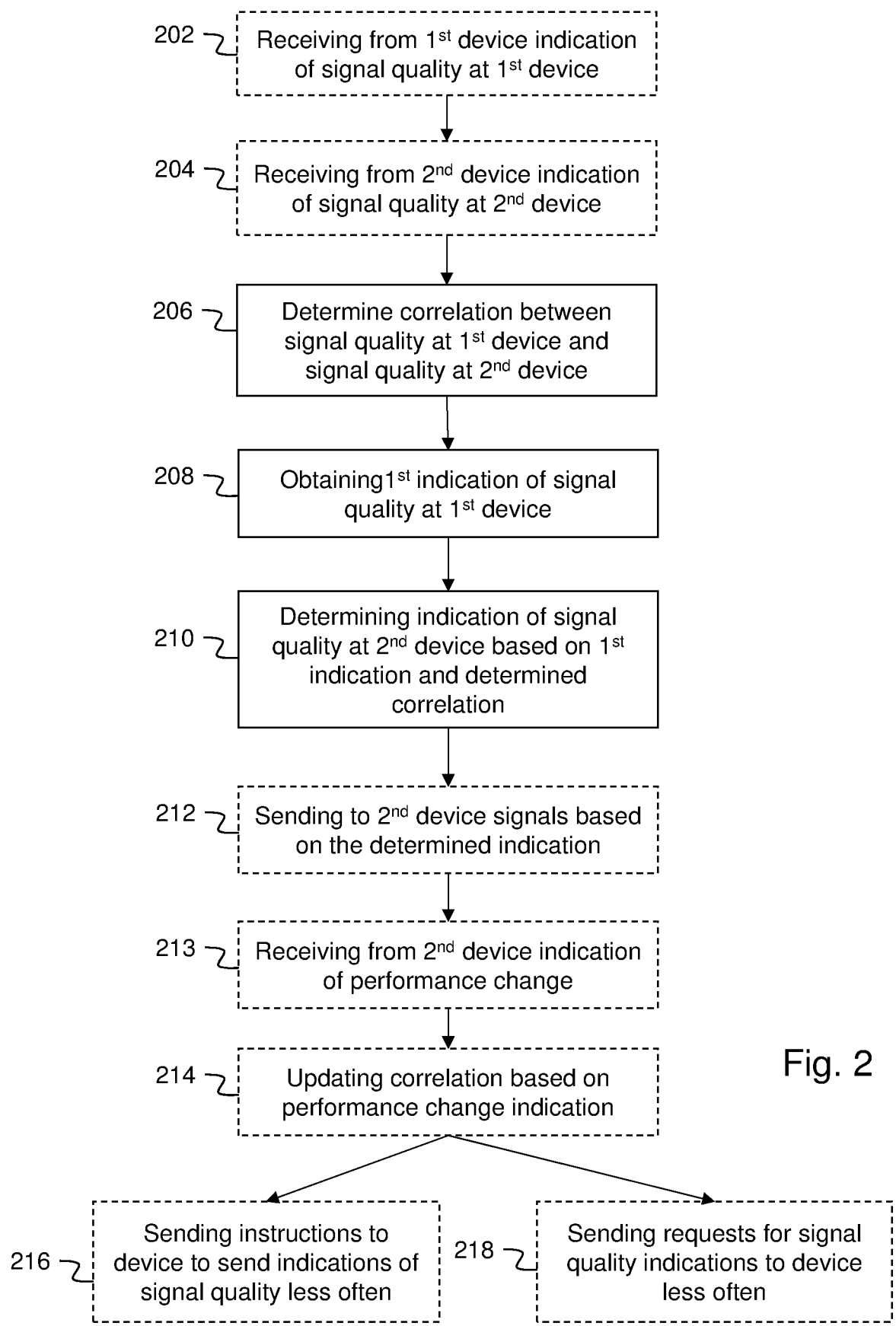
FIG. 2 is a flow chart illustrating a method performed by a system, according to possible embodiments.

FIG. 2, in conjunction with FIG. 1, describes a method performed by a system of a wireless communication network 100 for determining signal quality indications. The method comprises determining 206 a correlation between a quality of a signal received at a first wireless device 140 and a quality of a signal received at a second wireless device 150, obtaining 208 a first indication of quality of a signal received at the first wireless device 140, and determining 210 a second indication of quality of signals received at the second wireless device 150 based on the first indication and the determined correlation.

The system of the wireless communication network that performs the method may be a wireless communication network node, such as a core network node or the radio access network node 130 to which the first and second wireless device 140, 150 are connected, or a router. Alternatively, the system of the wireless communication network that performs the method may be a group of network nodes, wherein functionality for performing the method are spread out over different physical, or virtual, nodes of the network. In other words, the system for determining signal quality indications may in its turn be a cloud-solution, i.e. the system may be deployed as cloud computing resources that may be distributed in the network.

The first indication of signal quality at the first wireless device may be obtained by being received from the first wireless device, or the first indication may be received from a node in between, such as the radio access network node 130 that the first wireless device is connected to, but the first indication may originate from the first wireless device. "A quality of a signal" may refer to a quality of a signal received from the radio access network node 130 to which the first and the second wireless device are connected. A correlation between a received signal quality at the first wireless device and a received signal quality at the second wireless device can be determined in many different ways. As a first embodiment, a correlation can be determined if there is a correlation between quality measurement values for the first and the second wireless device. As an example, there is a positive correlation if the values for the first and second device vary in a similar way over time. However, other correlations may apply, such as a negative correlation, which is if the values change opposite each other over time. Correlation is often presented as normalized with mean of signals, hence lie in the span between −1 to 1. In other words, correlation can be determined if quality measurement values over time for the first wireless device and quality measurement values over time for the second wireless device have a mutually associated relationship.

Quality measurement values may be e.g. signal strength and/or interference related measurements at the first and the second wireless device, e.g. SINR.

There are also other embodiments of determining a correlation between a received signal quality at the first wireless device and a received signal quality at the second wireless device, which embodiments are more indirectly related to the received signal quality. As a third embodiment, information of a position of the first wireless device and information of a position of the second wireless device are used for the determining 206 of a correlation between a received signal quality at the first wireless device and a received signal quality at the second wireless device. For example, correlation can be determined when such position information shows that the first and the second wireless device are located at a similar physical position. For example, when a positioning application determines that the position of the first device and the position of the second device are within a certain defined distance from each other, a correlation can be determined. Such a correlation is plausible as the first and the second device are then often connected to the same base station and are interfered by similar neighboring base stations. Also, the first and the second device may then experience a similar interference from neighbouring base stations. According to a fourth embodiment, information of the first and the second device both being connected to a base station at which the interference is known to be approximately uniform over the coverage of the base station is used for determining 206 correlation. This is especially common for base stations having a comparatively small geographical coverage, such as a pico or femto base station, which are at the same time within the coverage of a macro base station. An example of such a base station in which the interference is approximately uniform is a base station covering a floor of a building.

The first indication of quality of a signal received at the first device may be a quality measurement value, measured at the first wireless device, such as a signal strength measurement of a signal sent from the radio access network node, an interference measurement of a signal sent from neighboring radio access network nodes, a Signal to Interference Ratio (SIR) value, or a Signal to Interference and Noise Ratio (SINR) value measurement. Alternatively the first indication may be a Channel Quality Indicator (CQI) or an acknowledgement/not acknowledgement message (ACK/NACK), wherein an ACK is an indicator of an acceptable signal quality and a NACK is an indicator of a non-acceptable signal quality.

A possible embodiment for determining the second indication based on the correlation and the first indication is to set the second indication to a similar value as indicated by the first indication, scaled by its own relative magnitude. As an example, when a strong correlation is assumed, if the first indication indicates a 3 dB SNR increase, the second indication could also be set to a 3 dB SNR increase. As another example for strong correlation, if the interference level at the second device is determined to be half the interference level at the second device, the second indication would be half of the first indication.

By looking for such correlations between first and second wireless devices, and when a correlation is determined, using one or more indications of signal quality at the first device to determine signal quality at the second wireless device, a quicker adaptation to changed radio conditions is achieved given the same overhead. In other words, when the first indication is achieved, the second indication can be set more or less at once and you do not need to wait for receiving such a second indication. Further, less measurements need to be performed by the second wireless device and therefore battery power can be saved by the second wireless device. Also, as less measurements are sent over the air interface between the second wireless device and the radio access network node, capacity of the air interface can be saved uplink. Further, reliability and robustness are increased by allowing more accurate estimates of interference. This is especially true for wireless devices that have poor channel quality, which are typically limited in the amount of signal quality feedback that they may send.

According to an embodiment, the method further comprises receiving 202 a third indication of quality of a signal received at the first wireless device 140, and receiving 204 a fourth indication of quality of a signal received at the second wireless device 150. Further, the correlation is determined 206 based on the third indication and the fourth indication.

The third and fourth quality indications can be measurement values determined by the respective first and second wireless device on wireless signals sent by the radio access network node, e.g. signal strength, and possibly also by neighboring radio access network nodes, e.g. SIR or SINR. The third and fourth quality indications may also be positioning values determined by the first and the second wireless device, such as GPS coordinates.

According to an embodiment, the third indication comprises at least two measurement values determined by the first wireless device on wireless signals received from a radio access network node and/or from neighboring radio access network nodes, and the fourth indication comprises at least two measurement values determined by the second wireless device on wireless signals received from the radio access network node and/or from neighboring radio access network nodes.

According to an embodiment, the third indication comprises a plurality of indications received over time and the fourth indication comprises a plurality of indications received over time. Further, the method comprises determining statistics over time based on the plurality of third and fourth indications. The correlation is then determined 206 based on the determined statistics over time.

A plurality of earlier signal quality indications are taken into consideration and statistics are determined over time for signal quality at the first device and signal quality at the second device. In other words, statistics of historical signal quality indications are compared to determine the correlation for the signals. Hereby, a correlation that is reliable over time can be determined. Statistical correlation between two series of values may be determined in many different ways. The theory behind is described in e.g. https://en.wikipedia.org/wiki/Correlation_and_dependence.

According to another embodiment, the method further comprises triggering sending 212, to the second wireless device 150, signals modulated or coded based on the determined 210 second indication of signal quality. Hereby, a suitable coding for sending signals to the second wireless device can be used, which well utilizes wireless communication resources.

According to an embodiment, the method further comprises receiving 213, from the second wireless device 150, an indication of change in performance at the second wireless device based on the sent 212 signals modulated or coded using the determined second indication, and updating 214 the determined 206 correlation based on the received indication of performance change. Hereby, the correlation may be up to date by reacting on feedback from the network. The determined correlation may further be updated together with the statistics determined in one of the earlier embodiments.

According to another embodiment, the method further comprises triggering sending 216, based on the determined 210 correlation, an instruction to at least one of the first wireless device 140 and the second wireless device 150 to send indications of quality of signals to the radio access network node 130 less often than before the correlation was determined, or triggering sending 218, based on the determined 210 correlation, requests to at least one of the first wireless device 140 and the second wireless device 150 for indications of quality of signals, the requests being sent less often than before the correlation was determined. By sending indications of signal quality, such as measurement reports, less often to the radio access network node when a correlation has been determined, battery of the first and/or second wireless device can be saved. Also, wireless communication resources are saved.

According to another embodiment, the first indication indicates a quantitative change of signal quality at the first wireless device and the second indication is determined 210 to be a quantitative change of signal quality of a similar amount as indicated by the first indication.

According to another embodiment, the first indication is a Not Acknowledged (NACK) message received from the first wireless device, and the second indication is determined based on the NACK message and the determined correlation. The NACK message may be information from the first wireless device that it has not received a message it should have received from the radio access network node. When a NACK is received and there is a determined 206 correlation, the second indication may be determined as an indication that signal reception quality at the second wireless device is too bad, e.g. below a set threshold.

According to another embodiment, the method further comprises adapting, based on the determined 210 correlation and on the first indication, a scheduling rate in a channel-quality dependent scheduler of the radio access network node 130 for signals to be sent to the second wireless device 150. When a correlation has been determined, the scheduling rate for signals sent to the second wireless device can be adapted to the channel quality of the first wireless device so that when there are favorable conditions at the first wireless device, transmission rate can increase to the second wireless device and vice versa.

In cellular communication, large parts of the interference experienced in one cell is generated by a relatively small set of other cells, in comparison to the complete set of base stations deployed in a network. This is illustrated by an example wireless communication network 300 shown in FIG. 3. Here, wireless device A 340 (hereinafter called $UE_A$) and wireless device B 350 (hereinafter called $UE_B$) are served by a first radio access network node 330, and wireless device C 360 (hereinafter called $UE_C$) is served by a second radio access network node 370. In other words, $UE_A$ and $UE_B$ are within a first cell 335 covered by the first radio access network node 330 and $UE_C$ is within a second cell 365 covered by the second radio access network node 370. Whenever second radio access network node 370 transmits to $UE_C$ 360, the interference level at both $UE_A$ 340 and $UE_B$ 350 will increase. As one example of such a situation, it may be noted that an indoor system along a single floor or close to a wall is most often interfered by one singe outdoor macro site.

This is a result of correlation in the communication channels towards $UE_A$ and $UE_B$, as described in the background. As further discussed in the background, link adaptation schemes adapt the modulation and coding to better match the current channel quality, e.g. interference level. This requires information of the signal quality as received at the UE, such as communication channel quality and interference. As noted in example above, interference is often correlated between UE's. Hence on a high level, the invention is to utilize the fact that interference may be correlated between UEs, e.g. those UEs having the same dominant interferers, and use this correlation to estimate interference for UEs based on measurements from other UEs. For example, if there is a determined interference correlation between $UE_A$ and $UE_B$, a signal quality measurement for $UE_A$ may be used to estimate signal quality at $UE_B$. Further, experienced interference statistics can be correlated with current channel conditions, and since large-scale statistics of a communication channel between a UE and a radio access network node is relatively constant over time, old interference measurement from one UE can at a later stage in time be utilized for another UE in the same location, or with similar channel conditions, before any new interference statistics are available. This can be used to get quicker signal quality estimates/interference estimates and/or to reduce a frequency for UEs to report signal quality to the radio access network nodes, which saves resources and reduces interference on control signaling.

Figure 3:
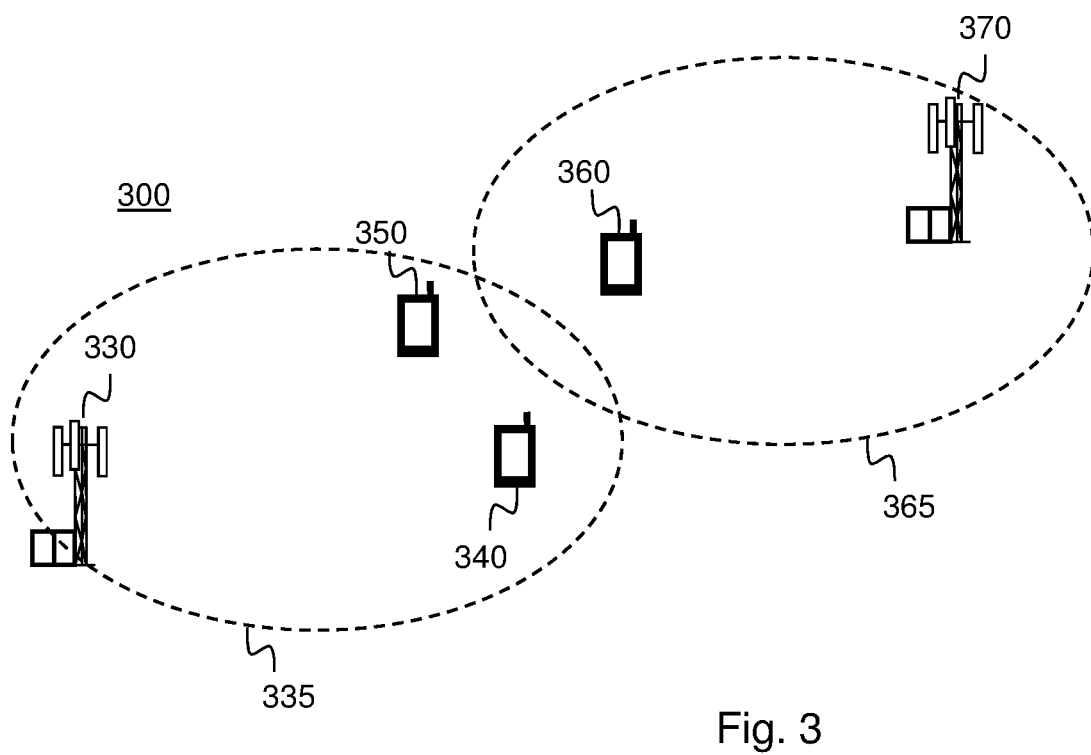
FIG. 3 is a schematic block diagram of another communication scenario in which the present invention may be used.

In the following, different embodiments of the invention is shown, illustrated by the exemplary scenario setup shown in FIG. 3. In a first embodiment, the first radio access network node 330 receives interference measurements from $UE_A$ 340 and $UE_B$ 350. The interference measurements are not necessarily received at the same time. The first radio access network node 330 detects a correlation between the interference measurements of $UE_A$ and the interference measurements of $UE_B$. Then when a new interference measurement is available for $UE_A$, this interference measurement may then together with the knowledge of the correlation be used for an updated estimate of the interference for $UE_B$.

In a second embodiment, the detected correlation is used for increasing performance of link adaptation. For example, the first radio access network node 330 sends data to $UE_A$ 340 and $UE_B$ 350, and receives channel quality indicators (CQI) in return from $UE_A$ and $UE_B$. The first radio access network node 330 detects a correlation between $UE_A$ and $UE_B$ based on the received CQIs. $UE_A$ then reports to the first radio access network node 330 a 10 dB drop in CQI from 15 dB to 5 dB. The first radio access network node assumes that the channel quality of $UE_B$ has also dropped, for example by 10 dB, and utilizes this information e.g. for link adaptation.

In a third embodiment, when the first radio access network node has detected a correlation between signal quality of $UE_A$ and signal quality of $UE_B$, and one or several negative acknowledgements (NACK) are received from $UE_A$, the NACKs are used as input to estimating signal quality or interference for $UE_B$.

In a fourth embodiment, the first radio access network node 330 logs the channel/signal quality information of $UE_A$ and $UE_B$ as well the interference information, to allow for a more robust link adaptation, even before new interference measurements have been obtained.

In a fifth embodiment, the first radio access network node 330 uses interference measurements from $UE_A$, to estimate the interference for $UE_B$, using the correlation of interference to the channel information logged according to the fourth embodiment. The first radio access network node further logs the channel information of $UE_A$ and $UE_B$ as well as feedback indication, regarding if the performance was improved or impaired when using the estimated interference statistics. One or several logs indicating improved or impaired performance is later used to indicate how valid interference estimation is for these sets of UE locations or channel conditions. As an example, channel information and interference measurements are available for $UE_A$. Then $UE_B$ enters the system and provides measurements of its communication channel. Based on the channel information and interference measurements of $UE_A$ and the measurements of the communication channel of $UE_B$, it is determined that channel characteristics for $UE_A$ and $UE_B$ are similar enough to use $UE_A$'s interference measurements to estimate the interference of $UE_B$. A later report indicates that performance for $UE_B$ has improved, hence the system logs these pair of UE channel conditions as a set where interference interpolation is useful.

According to a sixth embodiment, the above obtained interference estimates are used in a channel quality dependent scheduler, for example in a proportional fair (PPF), or a max-rate scheduler. For example, where the use of an updated interference estimate provides an additional input allowing for example increasing scheduling rate for transmissions to $UE_A$ due to an estimated favorable condition based on reports from $UE_B$, or a decreased scheduling rate when unfavorable conditions are estimated based on report from $UE_B$.

Figure 4:
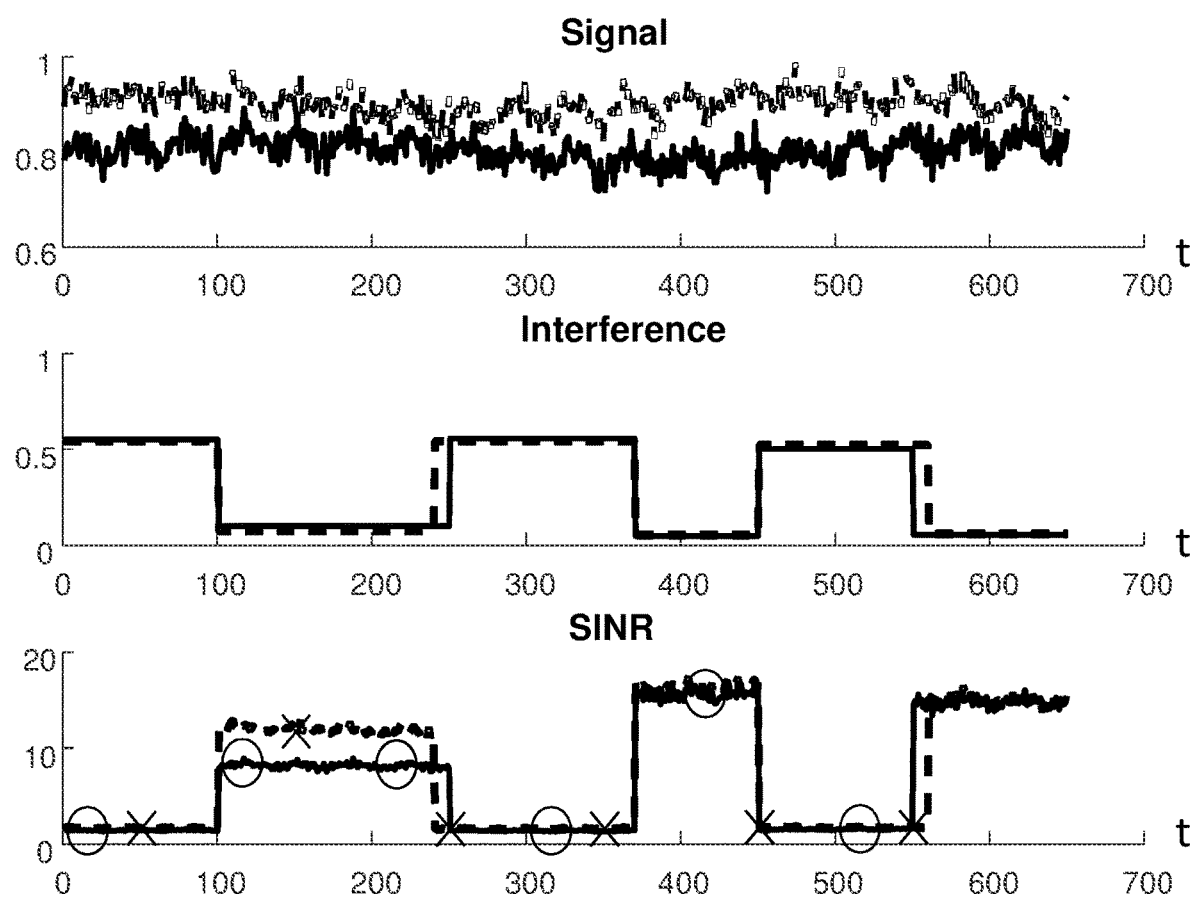
FIG. 4 are three x/y-diagrams illustrating how embodiments of the invention may be used.

FIG. 4 illustrates some benefits of the invention. The top diagram shows the signal level for $UE_A$ (the lower plot) and $UE_B$ (the upper plot) versus time (t), wherein the scales on the x- and y-axis are relative not any absolute measures. The middle diagram shows the interference levels for $UE_A$ (continuous line) and $UE_B$ (dashed line) respectively, and the bottom diagram shows SINR values for $UE_A$ (continuous line) and $UE_B$ (dashed line). In the bottom diagram, the circle markers indicate interference measurements from $UE_A$, and the crosses indicate the interference estimates for $UE_B$. Let us assume the logging for interference levels has been going on for a while and it has been determined that there clearly is correlation between signal quality measurements from $UE_A$ and $UE_B$. According to an embodiment, the interference estimate for $UE_B$ can be updated given the new measurements from $UE_A$, hence allowing a much more rapid update of the transmission settings at time t~=100. Without the invention, the first radio access network node would have kept transmissions to $UE_B$, assuming a low interference level as the last report indicated at time=50 all the way until time t~=150. In a similar fashion, the interference state can be updated for $UE_A$, already at time t~=250 given the measurement form $UE_B$. In practice, this results in the benefit from a twice as high reporting interval, at no increase in signaling level.

In FIG. 4 and in the above embodiments, it is argued that given a few samples of interference measurements, the correlation between signals received at two wireless devices can be estimated, and then used for link adaptation. In scenarios with timewise short packet transmissions, there may be too little time to estimate the correlation in real time between two wireless devices, hence the value of utilizing potential correlation is less. In such a case, a long-term estimate can be used, hence removing the need for instantaneous measurements/estimations of correlations. According to an embodiment, whenever there is information of long-term correlation, this is used up to an occasion where the short term per UE correlation may be estimated.

Below is described an embodiment for obtaining long-term correlation in a beam forming embodiment. In the case of reciprocity, e.g. non-codebook, or non-fixed beam setup, the radio access network node defines a set of spatial sectors in the cell, could be both horizontally and vertically spread. As an example, consider horizontal spread only. The site covers an angular spectrum interval between −60° to +60°. Then, a set of angular intervals of 5° are defined, i.e. 25 smaller sectors in the span −60°→60°. For each of the devices served in the cell, the radio access network node estimates the direction to/from the devices. Further for each direction, the radio access network node logs the interference measurements vs. time, potentially independent of which devices reported each measurement. When ample data has been collected, the radio access network node calculates the correlation between angular segments. For a codebook-based setup, the angular segments could instead be interchanged with the codewords in a codebook, or the fixed amount of beams that the radio access network node may use, as for example in an analog beam setting case from a milli-meter-wave (mmW) product. Whenever a new device enters the cell, the direction of arrival/departure is estimated. The device is by these measurements categorized in one of the segments, and the correlation between the segments of the device and another device is used together with available new interference measurements for link adaption on both links. This is done until the point where all data is served to the devices or whenever there is ample amount of measurements to update the given correlation in the specific links, potentially combining the long-term correlation with the additional short-term measurements. As mentioned in embodiments above, new measurements are used to update the existing long-term correlation statistics. The described method works for codebook based setups as well. In this case there is no need to define the angular intervals but instead the coverage of each codeword could be used.

Figure 5:
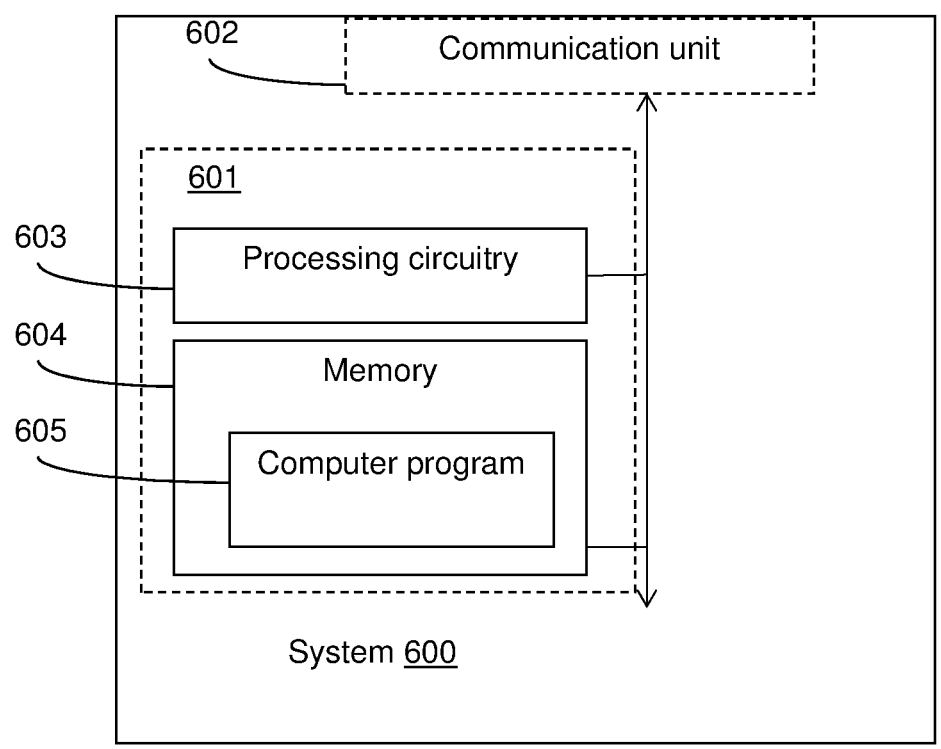
FIG. 5 is a block diagram illustrating a system in more detail, according to further possible embodiments.

FIG. 5, in conjunction with FIG. 1, describes an embodiment of a system 600 operable in a wireless communication system 100 for determining signal quality indications. The system 600 comprises a processing circuitry 603 and a memory 604. The memory contains instructions executable by said processing circuitry, whereby the system 600 is operative for determining a correlation between a quality of a signal received at a first wireless device 140 and a quality of a signal received at a second wireless device 150, for obtaining a first indication of quality of a signal received at the first wireless device 140, and for determining a second indication of quality of signals received at the second wireless device 150 based on the first indication and the determined correlation.

The system of the wireless communication network may be a wireless communication network node, such as a core network node or the radio access network node 130 to which the first and second wireless device 140, 150 are connected, or a router. Alternatively, the system of the wireless communication network may be a group of network nodes, wherein functionality for performing the method are spread out over different physical, or virtual, nodes of the network. In other words, the system for determining signal quality indications may in its turn be a cloud-solution, i.e. the system may be deployed as cloud computing resources that may be distributed in the network.

According to an embodiment, the system 600 is further operative for receiving a third indication of quality of a signal received at the first wireless device, and receiving a fourth indication of quality of a signal received at the second wireless device 150. Further, the system 600 is operative for determining the correlation based on the third indication and the fourth indication.

According to an embodiment, the third indication comprises a plurality of indications received over time and the fourth indication comprises a plurality of indications received over time. Further, the system is further operative for determining statistics over time based on the plurality of third and fourth indications, and the system 600 is operative for determining the correlation based on the determined statistics over time.

According to another embodiment, the system 600 is further operative for triggering sending, to the second wireless device (150), signals modulated or coded based on the determined second indication of signal quality. I.e. in case the system 600 is a cloud-solution, the system triggers the radio access network node 130 to send signals modulated or coded based on the determined second indication of signal quality.

According to another embodiment, the system 600 is further operative for receiving, from the second wireless device 150, an indication of change in performance at the second wireless device based on the sent signals modulated or coded using the determined second indication, and updating the determined correlation based on the received indication of performance change.

According to another embodiment, the system 600 is further operative for triggering sending, based on the determined correlation, an instruction to at least one of the first wireless device 140 and the second wireless device 150 to send indications of quality of signals to the system 600 less often than before the correlation was determined, or triggering sending, based on the determined correlation, requests to at least one of the first wireless device 140 and the second wireless device 150 for indications of quality of signals, the requests being sent less often than before the correlation was determined.

According to another embodiment, the first indication indicates a quantitative change of signal quality at the first wireless device and the second indication is determined to be a quantitative change of signal quality of a similar amount as indicated by the first indication.

According to another embodiment, the first indication is a NACK message received from the first wireless device. Further, the system is operative for determining the second indication based on the NACK message and the determined correlation.

According to another embodiment, the system 600 is further operative for adapting, based on the determined correlation and on the first indication, a scheduling rate in a channel-quality dependent scheduler of the radio access network node 130 for signals to be sent to the second wireless device 150.

According to other embodiments, the system 600 may further comprise a communication unit 602, which may be considered to comprise conventional means for communication with nodes of the wireless communication network 100. Further, in case the system 600 is implemented in e.g. the radio access network node 130, the communication unit 602 may comprise conventional means for wireless communication with the wireless communication devices 140, 150, such as a transceiver for wireless transmission and reception of signals. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the system 600 to perform the steps described in any of the described embodiments of the system 600 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the system 600 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a system of a wireless communication network for determining signal quality indications, the method comprising:
   determining a correlation between a quality of a signal received at a first wireless device and a quality of a signal received at a second wireless device;
   obtaining a first indication of quality of a signal received at the first wireless device;
   determining a second indication of quality of signals received at the second wireless device based on the first indication and the determined correlation; and
   triggering sending, based on the determined correlation, one of:
      an instruction to at least one of the first wireless device and the second wireless device to send indications of quality of signals to a radio access network node less often than before the correlation was determined; and
      requests to at least one of the first wireless device and the second wireless device for indications of quality of signals, the requests being sent less often than before the correlation was determined.

2. The method according to claim 1, further comprising:
   receiving a third indication of quality of a signal received at the first wireless device, and
   receiving a fourth indication of quality of a signal received at the second wireless device,
   wherein the correlation is determined based on the third indication and the fourth indication.

3. The method according to claim 2, wherein the third indication comprises a plurality of indications received over time and the fourth indication comprises a plurality of indications received over time, the method further comprising:
   determining statistics over time based on the plurality of third and fourth indications and wherein the correlation is determined based on the determined statistics over time.

4. The method according to claim 2, further comprising:
   triggering sending, to the second wireless device, signals one of modulated and coded based on the determined second indication of signal quality.

5. The method according to claim 1, further comprising:
   triggering sending, to the second wireless device, signals one of modulated and coded based on the determined second indication of signal quality.

6. The method according to claim 5, further comprising:
   receiving, from the second wireless device, an indication of change in performance at the second wireless device based on the sent signals one of modulated and coded using the determined second indication, and
   updating the determined correlation based on the received indication of performance change.

7. The method according to claim 1, wherein the first indication indicates a quantitative change of signal quality at the first wireless device and the second indication is determined to be a quantitative change of signal quality of a similar amount as indicated by the first indication.

8. The method according to claim 1, wherein the first indication is a Not Acknowledged, NACK, message received from the first wireless device, and the second indication is determined based on the NACK message and the determined correlation.

9. The method according to claim 1, further comprising:
   adapting, based on the determined correlation and on the first indication, a scheduling rate in a channel-quality dependent scheduler of a radio access network node for signals to be sent to the second wireless device.

10. A system operable in a wireless communication system for determining signal quality indications, the system comprising a processing circuitry and a memory, the memory containing instructions executable by the processing circuitry to cause the system to:
determine a correlation between a quality of a signal received at a first wireless device and a quality of a signal received at a second wireless device;
obtain a first indication of quality of a signal received at the first wireless device; and
determine a second indication of quality of signals received at the second wireless device based on the first indication and the determined correlation;
trigger sending, to the second wireless device, signals one of modulated and coded based on the determined second indication of signal quality;
receive, from the second wireless device, an indication of change in performance at the second wireless device based on the sent signals one of modulated and coded using the determined second indication; and
update the determined correlation based on the received indication of performance change.

11. The system according to claim 10, further caused to:
receive a third indication of quality of a signal received at the first wireless device; and
receive a fourth indication of quality of a signal received at the second wireless device,
and wherein the system is caused to determine the correlation based on the third indication and the fourth indication.

12. The system according to claim 11, wherein the third indication comprises a plurality of indications received over time and the fourth indication comprises a plurality of indications received over time, and the system is further caused to:
determine statistics over time based on the plurality of third and fourth indications,
and wherein the system is caused to determine the correlation based on the determined statistics over time.

13. The system according to claim 10, being further caused to one of:
trigger sending, based on the determined correlation, an instruction to at least one of the first wireless device and the second wireless device to send indications of quality of signals to a radio access network node less often than before the correlation was determined; and trigger sending, based on the determined correlation, requests to at least one of the first wireless device and the second wireless device for indications of quality of signals, the requests being sent less often than before the correlation was determined.

14. The system according to claim 10, wherein the first indication indicates a quantitative change of signal quality at the first wireless device and the second indication is determined to be a quantitative change of signal quality of a similar amount as indicated by the first indication.

15. The system according to claim 10, wherein the first indication is a NACK message received from the first wireless device, and the system is operative for determining the second indication based on the NACK message and the determined correlation.

16. The system according to claim 10, being further caused to:
adapt, based on the determined correlation and on the first indication, a scheduling rate in a channel-quality dependent scheduler of a radio access network node for signals to be sent to the second wireless device.

17. A non-transitory computer storage medium storing a computer program comprising instructions, which, when executed by at least one processing circuitry of a system of a wireless communication network, configured for determining signal quality indications, causes the system to:
determine a correlation between a quality of a signal received at a first wireless device and a quality of a signal received at a second wireless device;
obtain a first indication of quality of a signal received at the first wireless device; and
determine a second indication of quality of signals received at the second wireless device based on the first indication and the determined correlation; and
trigger sending, based on the determined correlation, one of:
an instruction to at least one of the first wireless device and the second wireless device to send indications of quality of signals to a radio access network node less often than before the correlation was determined; and
requests to at least one of the first wireless device and the second wireless device for indications of quality of signals, the requests being sent less often than before the correlation was determined.

* * * * *